Aug. 30, 1955
S. A. COGSDILL ET AL
2,716,360
DEBURRING TOOL
Filed July 21, 1954
2 Sheets-Sheet 1
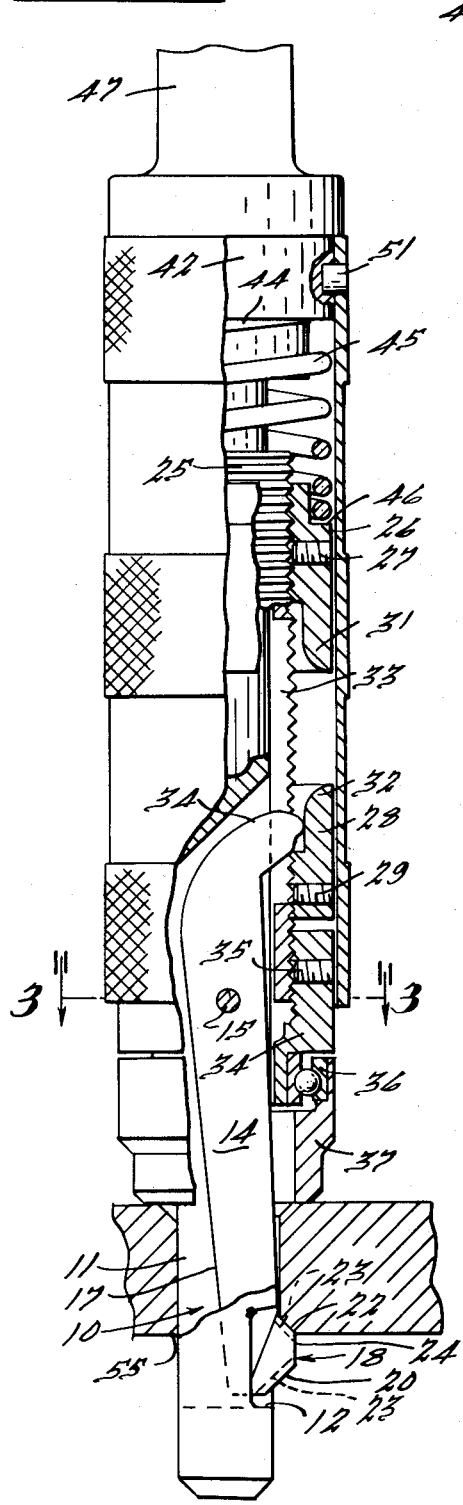
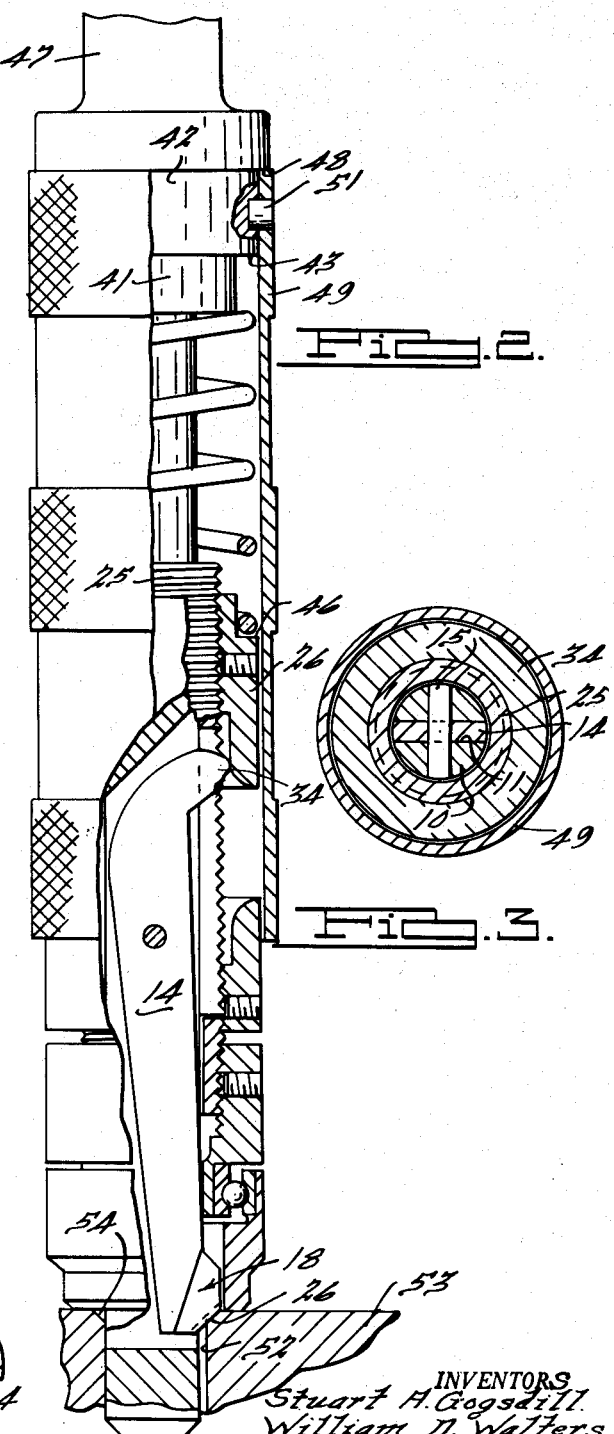
INVENTORS
Stuart A. Cogsdill
William D. Walters
BY
Harness, Dickey & Pierce
ATTORNEYS

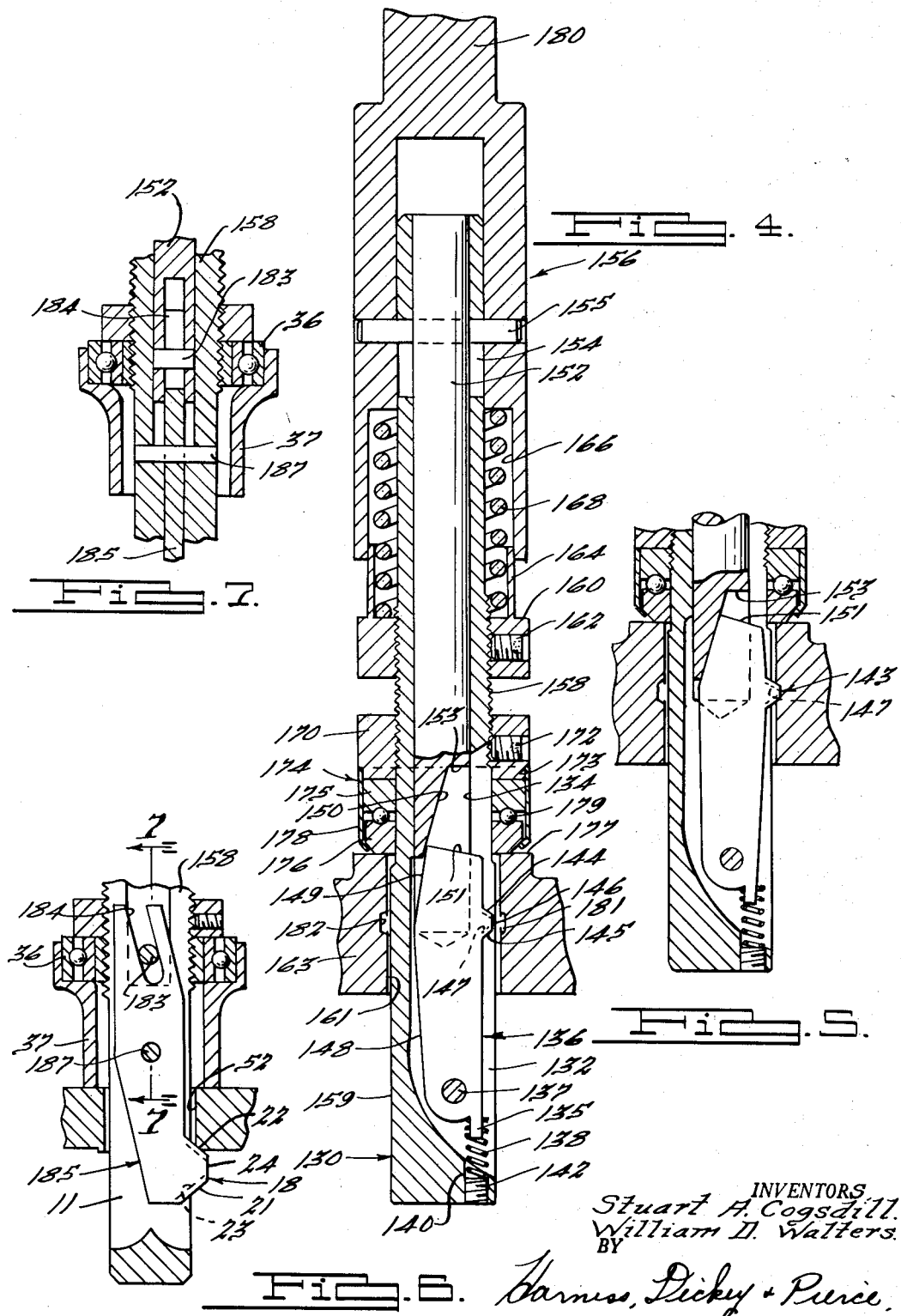

United States Patent Office 2,716,360
Patented Aug. 30, 1955

2,716,360
DEBURRING TOOL

Stuart A. Cogsdill, Detroit, and William D. Walters, Huntington Woods, Mich., assignors to Cogsdill Tool Products Inc., Oak Park, Mich., a corporation of Michigan Application July 21, 1954, Serial No. 444,726

5 Claims. (Cl. 77—73.5)

This invention relates to deburring tools, and particularly to a deburring tool which is capable of cutting a burr from surfaces of a workpiece which are inaccessible to the ordinary deburring tool.

In various operations on a workpiece, such as drilling, punching, grooving and the like, the cutting tool creates sharp burrs or ridges on the faces or surfaces engaged by the tool. These burrs are objectionable and in most instances must be removed in order to permit the workpiece to be assembled with other matching parts. Where the burr to be removed is on the opposite side of a heavy workpiece which cannot be easily turned upside down or where the burr is on the edge of some intermediate groove or slot in the wall of an aperture in a workpiece, it must ordinarily be removed by a costly and inefficient hand operation.

Accordingly, the main objects of the invention are: to provide a deburring tool having an elongated body resiliently mounted in a tubular driving member and provided with an adjustable limiting means adapted to limit the operating depth of the tool; to provide a resiliently biased body having a flat elongated deburring blade pivotally mounted in a lengthwise slot therein and which is provided with a means for pivoting the blade into a work-engaging position at a desired point in the tool travel; to provide a deburring tool for cutting a burr from a preselected edge of a workpiece which, because of its unhandy location, must ordinarily be removed by a costly and inefficient hand operation; and, in general, to provide a deburring tool which is compact in construction and economical of manufacture.

Other objects and features of novelty of the invention will be specifically pointed out or will become apparent when referring, for a better understanding of the invention, to the following description taken in conjunction with the accompanying drawings, wherein:

Figure 1 is a broken, vertical sectional view of a deburring tool embodying features of the present invention, in position to cut a burr from the bottom of a workpiece;

Fig. 2 is a sectional view of the structure illustrated in Fig. 1, taken substantially on the line 2—2 thereof, with the tool in position to cut a burr from the top of the workpiece;

Fig. 3 is a sectional view of the structure illustrated in Fig. 1, taken on the line 3—3 thereof;

Fig. 4 is a sectional view of a tool, similar to that illustrated in Fig. 1, showing another form thereof;

Fig. 5 is a broken view of the structure illustrated in Fig. 4, with the blade of the tool in cutting position;

Fig. 6 is a view of structure, similar to that illustrated in Fig. 5, showing another form thereof, and Fig. 7 is a sectional view of the structure illustrated in Fig. 6, taken on the line 7—7 thereof.

Referring to Figs. 1 to 3, the deburring tool of the present invention embodies a stem 10 having a slot 11 therein near its lower end in which a blade 14 is disposed. The blade is secured to the stem by a pivot 15. The rear edge of the blade 17 slopes so as to permit the blade to pivot within the diameter of the stem, retracting a nib 18 on the opposite side from the workpiece. The nib has a forwardly disposed cutting edge 20 and a rearwardly disposed cutting edge 22 relieved at 23 opposite to the direction of rotation of the stem, with a bearing portion 24 disposed between the cutting portions. Adjacent to the nib, the side of the stem 10 is cut away at 12 to provide chip clearance for the cuttings removed by the nib.

The stem 10 extends through a threaded sleeve 25 having a cam ring 26 adjustably threaded thereon and secured in position by a setscrew 27. A second cam ring 28 is adjustably mounted on the threaded sleeve 25 near the lower end thereof, being secured in adjusted position by a set screw 29. The cam portion 31 of the ring 26 extends downwardly, while the cam portion 32 of the ring 28 extends upwardly. A slot 33 is provided in the threaded sleeve 25 through which an extending arm 34 on the blade 14 projects in position to be engaged by the cam portions 31 and 32. The threaded sleeve 25 at its lower end has a ring 30 threaded thereon and secured in adjusted position by a setscrew 35.

A ball bearing 36 is secured to the lower end of the ring 30 and to an abutment ring 37 at the forward end of the tool through which the stem 10 extends. At the upper end, the stem is enlarged at 41 and 42 providing a shoulder 43 for receiving an end 44 of a coil spring 45, the opposite end of which engages a shoulder 46 on the cam ring 26. Beyond the enlarged portions 42, a driving end 47 is provided forming a shoulder 48 against which an enclosing sleeve 49 abuts when secured to the enlarged portion 42 by one or more pins 51. With this arrangement, the threaded sleeve 25 is retained against longitudinal movement as the stem is advanced from the abutment ring 37.

Referring to Fig. 2, it will be noted that the extending arm 34 of the blade 14 has been moved inwardly by the cam portion 31 of the ring 26, moving the blade portion 20 into cutting relation with the top of an aperture 52 in a workpiece 53. A chamfer 54 is cut at the top edge of the aperture 52 as the tool is rotated and the stem 10 advanced. The advancement of the stem 10 causes the arm 34 to move downwardly relative to the cam ring 26 since the sleeve 25 is retained from axial movement by the engagement of the abutment member 37 with the top of the workpiece. The passing of the arm 34 downwardly beyond the cam portion 31 permits the blade 14 to shift clockwise, retracting the nib 18 sufficiently to have the outer rubbing surface 24 clear the aperture 52 as the downward advancement of the stem continues. The spacing of the cam portion 32 of the cam ring 28 from the cam portion 31 of the ring 26 is such as to cause the nib to move outwardly when the extending arm 34 engages the cam portion 32. A chamfer 55 is cut on the lower end of the aperture 52 by the rearwardly disposed cutting edge 22, as clearly disclosed in Fig. 1. After the cutting of the chamfer 55 has been completed, the retraction of the driving head 47 and stem 10 permits the arm portion 34 of the blade 14 to move from the cam portion 32 of the cam ring 28 and thereby retract the nib as the stem continues to move upwardly relative to the threaded sleeve 25 which is retained in downward position, with the abutment portion 37 engaging the workpiece by the spring 45. Near the end of the upward travel of the stem 10, the extending arm 34 of the blade 14 is engaged by the cam portion 31 of the ring 26 and the nib is again moved outwardly to be in position to cut a chamfer 54 on the aperture of the next workpiece to be deburred. The thickness of the workpieces will require the nib to be moved outwardly at different positions of advancement of the stem 10, and adjustment is made by shifting the cam ring 28 upwardly or downwardly on the threaded sleeve 25 so as to have the cam portion 32 engage the extending arm 34 of the blade at a proper time to cut the chamfer on the bottom end of the aperture of the workpiece.

Figs. 4 and 5 show a further embodiment of the invention having an elongated body 130 provided with a lengthwise slot 132 in the lower end on one side which communicates with an axial aperture 134 in the upper end thereof. The slot 132 contains a flat elongated blade 136 mounted on a pivot 137 which is disposed near the lower end of the blade. The lower end of the blade 136 is provided with a downward projection 135 along the outer side thereof on which is seated one end of an axially disposed spring 138 adapted to resiliently bias the blade 136 inwardly to a retracted position within the slot 132 in the lower end of the body 130. The tension of the spring 138 may be adjusted by the setscrew 142 which abuts the other end of the spring and is threadably mounted in the aperture 140 in the lower end of the body 130. The blade 136 is provided on its outer side near the upper end thereof with a nib 143 having an upper cutting edge 144 and a lower cutting edge 145, with a central bearing portion 146 disposed therebetween. The cutting edges 144 and 145 are relieved at 147 opposite to the direction of rotation of the body 130. The inner side of the blade 136, opposite to that containing the nib 146, is sloped at 148 to permit the nib to be retracted within the slot 132. The upper end of the blade 136 has a slanting surface at 149 on the inner side opposite the nib 143, adapted to pivot the blade 136 outwardly to a cutting position when pressure is exerted on it by a similar slanting surface 150 provided on the lower end of the plunger 152 which is slidably mounted in the aperture 134 in the body 130. The upper end of the blade 136 is provided with a sloping surface at 151 which is adapted to abut the surface 153 on the lower end of plunger 152 to limit the outward pivotal movement of the blade. The movement of the plunger 152 in the aperture 134 is restricted by a cross pin 155 which is rigidly mounted in the plunger and which passes through the longitudinal slot 154 in the body 130 and has its outer ends fixedly secured in the tubular driving member 156.

The outer surface of the body 130 is threaded intermediate the ends thereof at 158. The lower end of the body 130 which is slightly enlarged at 159 serves as a pilot for guiding the tool into the aperture 161 in the workpiece 163. An internally threaded stop collar 160 is mounted on the threaded surface 158 and may be locked thereon by the setscrew 162. Extending upwardly from the stop collar 160 but spaced from the body 130 is an integral sleeve 164. The lower end of the tubular driving member 156 is provided with an enlarged opening 166 adapted to telescopically receive the sleeve 164. A spring 168, having one end seated in the opening 166 of the driving member 156 and the other end in the sleeve 164, resiliently biases the body 130 outwardly of the tubular driving member 156 against the restraining action of cross pin 155 which is slidable in the slot 154 in the body 130. Threadably mounted on the lower portion of the threaded surface 158 is a second stop collar 170 which may be locked thereon by the setscrew 172. A limiting means 174 is mounted on the threaded surface 158 and is adapted to be held in place by the stop collar 170. The limiting means 174 is provided with a bearing means, including an upper bearing race 175 mounted on the body 130 below the stop collar 170, with a free fit, and a lower bearing race 176 mounted with a loose fit and adapted to abut against the work surface 177 of the workpiece 163. A plurality of ball bearings 179 are disposed intermediate the bearing races 175 and 176 which are operatively joined by a retaining sleeve 178, the upper end of which is held on the lower end of stop collar 170 by a press fit, as at 173. The upper end of the tubular driving member 156 is provided with a shank 180 which may be formed to correspond with the drive means employed for supporting and rotating the shank.

The embodiment of Fig. 5 is especially adapted for removing the burr from the edges of a slot cut in the wall of an aperture 161 in the workpiece 163. In operation, the shank 180 is supported in a suitable machine tool spindle which rotates the tool as the pilot portion 159 of the body 130 is advanced through an aperture 161 in a workpiece 163. During such advancement, the blade 136 is retracted inwardly within the slot 132 to a position as shown in Fig. 5 by means of the spring 138 acting against the longitudinal projection 135 on the lower end of the blade 136. The plunger 152 is held in an inoperative position during the initial advancement by means of the spring 168 which resiliently biases the body 130 outwardly of the tubular driving member 156. The advancement of the tool is continued until the lower bearing race 176 of the limiting means 174 abuts the upper surface 177 of the workpiece 163. At that instant, the advancement of the body 130 is halted but it continues to rotate relative to the lower bearing race 176. The tubular driving member 156 is then advanced relative to the body 130 against the pressure of spring 168 to move the slanting surface 150 on the plunger 152 into engagement with the slanting surface 149 on the blade 136. As the advancement of the tubular driving member 156 relative to the body 130 continues, the blade 136 will be pivoted outwardly to a position as shown in Fig. 6, whereby the cutting edges 144 and 145 on the nib 143 will engage the burrs 181 on the edges of the slot 182 and cut them therefrom.

The amount of advancement of the tubular driving member 156 relative to the body 130 governs the outward movement of the nib 143 and such advancement may be controlled by adjusting the stop collar 160 on the threaded body surface 158. The limiting means 174 may be adjusted on the threaded surface 158 to set the tool for proper operation with respect to the depth or distance of the slot 182 from the upper surface 177 of the workpiece 163. It will be obvious that the limiting means 174 may also be adjusted to bring the cutting edge 144 to a position where it may be pivoted to cut a burr from the lower or opposite edge of an aperture.

Referring to Figs. 6 and 7, a further form of the invention is illustrated, that wherein the plunger 152 has a pin 183 extending therethrough engaged in a slot 184 in a blade 185 which is secured to the stem 158 by a pivot 187. The blade is otherwise similar to the blade 14 described hereinabove with regard to Figs. 1, 2 and 3. When the plunger 152 is moved downwardly, the pin 183, operating in the slot 184, causes the nib to move outwardly to cut the chamfer on the under side of the workpiece about the edge of the aperture 52 provided therein. Otherwise the structure is the same as that illustrated in the prior described figures.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A deburring tool including, in combination, a driving member having a stem extending therefrom, the end of the stem opposite to the driving member containing a slot, a deburring blade, a pivot securing said blade in said slot, said blade having an operating arm extending outwardly of said slot, an externally threaded sleeve slidable over said stem having a slot through which said arm extends, a pair of threaded cam sleeves adjustable on said thread on either side of said arm, and a limiting means on said externally threaded sleeve adapted to abut the workpiece on which the tool is operating to permit relative movement between said extending arm and said cam surfaces.

2. A deburring tool including, in combination, a driving member having a stem extending therefrom, the end of the stem opposite to the driving member having a slot, a deburring blade supported on a pin in said slot for limited angular movement therein, a sleeve slidable over said stem having an elongated aperture therein aligned with the slot of said stem, and an operating arm on said blade extending outwardly of said slot into said aperture for limiting the movement of the sleeve on the stem and retaining the sleeve thereon.

3. A deburring tool including, in combination, a driving member having a stem extending therefrom, the end of the stem opposite to the driving member having a slot, a deburring blade supported on a pin in said slot for limited angular movement therein, a sleeve slidable over said stem having an elongated aperture therein aligned with the slot of said stem, an operating arm on said blade extending outwardly of said slot into said aperture for limiting the movement of the sleeve on the stem and retaining the sleeve thereon, and a pair of cam elements spaced apart on the outer surface of said sleeve between which said arm extends for rocking the blade within the slot when the sleeve and stem are relatively moved.

4. A deburring tool including, in combination, a driving member having a stem extending therefrom, the end of the stem opposite to the driving member having a slot, a deburring blade supported on a pin in said slot for limited angular movement therein, a sleeve slidable over said stem having an elongated aperture therein aligned with the slot of said stem, an operating arm on said blade extending outwardly of said slot into said aperture for limiting the movement of the sleeve on the stem and retaining the sleeve thereon, and a cam element on the outer surface of said sleeve in position to engage said arm when the sleeve and stem are relatively moved to rock the blade in the slot.

5. A deburring tool including, in combination, a driving member having a stem extending therefrom, the end of the stem opposite to the driving member having a slot, a deburring blade supported on a pin in said slot for limited angular movement therein, a sleeve slidable over said stem having an elongated aperture therein aligned with the slot of said stem, an operating arm on said blade extending outwardly of said slot into said aperture for limiting the movement of the sleeve on the stem and retaining the sleeve thereon, a cam element on the outer surface of said sleeve in position to engage said arm when the sleeve and stem are relatively moved to rock the blade in the slot, a second sleeve on the outer end of said first sleeve, and a thrust bearing between said sleeves.

References Cited in the file of this patent
UNITED STATES PATENTS

| | | |
|---|---|---|
| 348,412 | Perrigo | Aug. 31, 1886 |
| 963,596 | Lescure | July 5, 1910 |
| 1,530,593 | Calkins | Mar. 24, 1925 |
| 2,433,976 | Babka | Jan. 6, 1948 |
| 2,495,583 | Heron | Jan. 24, 1950 |
| 2,520,639 | Johnson | Aug. 29, 1950 |